Jan. 18, 1949. A. HARGRAVES 2,459,762
TIRE TREAD
Filed Dec. 24, 1946
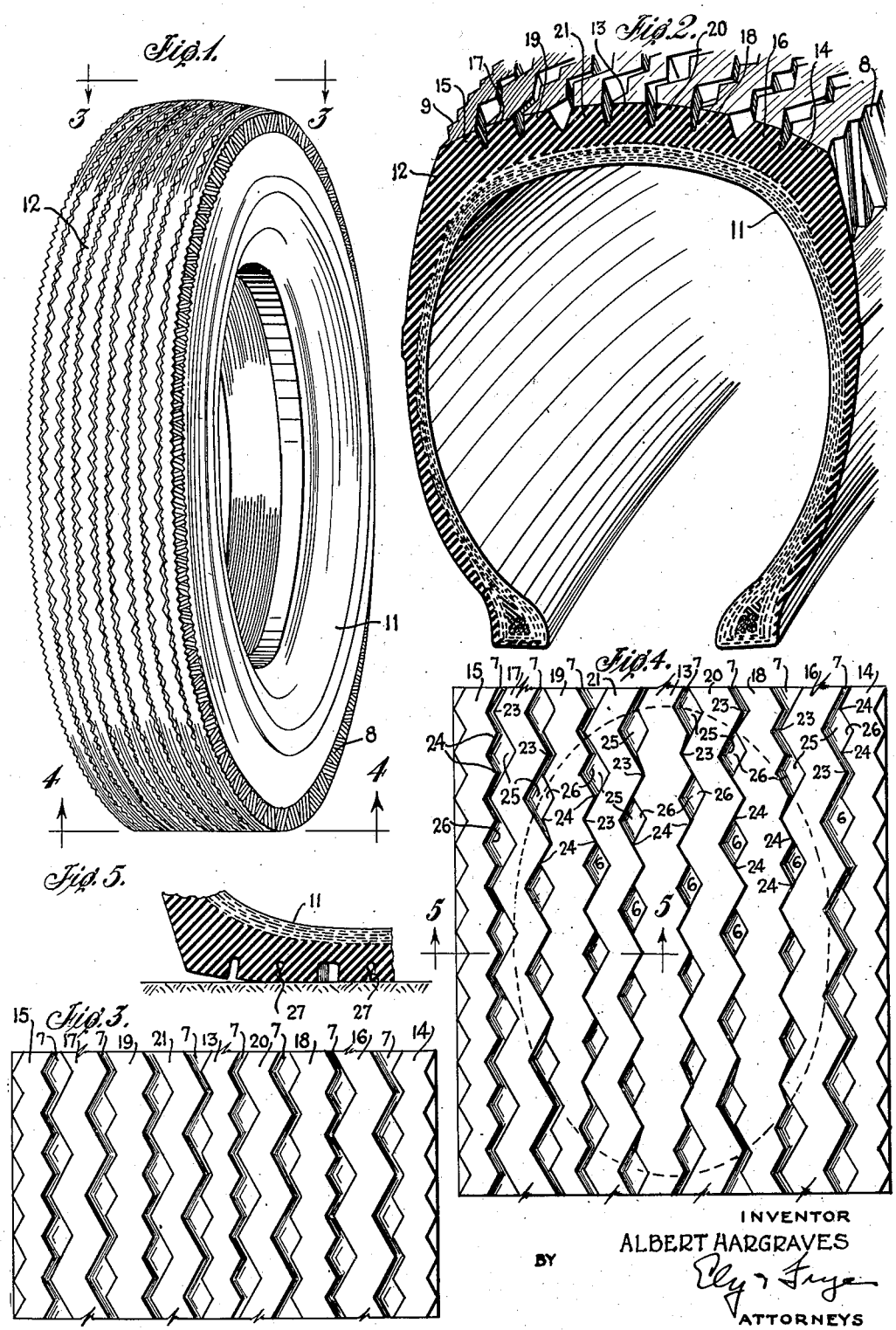
INVENTOR
ALBERT HARGRAVES
BY
ATTORNEYS Patented Jan. 18, 1949

2,459,762

UNITED STATES PATENT OFFICE 2,459,762

TIRE TREAD

Albert Hargraves, Cuyahoga Falls, Ohio, assignor to The Firestone Tire & Rubber Company, Akron, Ohio, a corporation of Ohio Application December 24, 1946, Serial No. 718,234

5 Claims. (Cl. 152—209)

This invention relates to improvements in treads for non-metallic tires and in particular concerns improvements in treads of pneumatic tires molded from rubber or rubber like materials.

The treads of such tires are commonly formed with a pattern comprising up-standing ribs and/or a plurality of studs each of which pattern units presents a working surface to that of the road. The present invention is illustrated by reference to a continuous rib tire; however, it is to be understood that the invention is not to be limited to such continuous ribs, but that in their stead a series of broken ribs, or elongated lugs, may be used without departing from the spirit of the invention. While the tread embodying the present invention has been designed with its esthetic appeal considered, its mechanical function is of primary concern.

An object of the present invention is to provide improved traction.

Another object of the invention is to provide an effective non-skid tread in which tread wear is less than in treads heretofore known which provide comparable traction.

A further object of the invention is to provide an effective non-skid tread that is quiet in service.

A still further object of the invention is to provide a tread adapted to eject pebbles.

A still further object of the invention is to provide an effective non-skid tread that is quiet and stable.

Another object of the invention is to provide a tread having grooves between non-skid tread elements, the tread being so constructed as to prevent the closing of the grooves at the tread's road contact surface at predetermined intervals along the grooves, and to prevent closing along the bottom of the grooves when said tread is under load.

Still another object of the invention is to provide a tread that prevents excessive lateral movement of the tread.

Yet another object of the invention is to provide a grooved tread that will not close at predetermined intervals along the grooves and thereby to provide recesses into which water trapped between the tread and the road may flow, and to provide means for the escape of water at the bottom of the recesses whereby actual contact between the tread and road surface is assured even during a hard rain storm.

Referring to the drawing:

Fig. 1 is a perspective view of a pneumatic tire embodying the invention;

Fig. 2 is a sectional perspective view, on a larger scale, of the tire shown in Fig. 1;

Fig. 3 is a fragmentary plan view, on a larger scale, of the tread of the tire as viewed from the line 3—3 of Fig. 1;

Fig. 4 is a view similar to Fig. 3 showing the road contact portion of the tread viewed from line 4—4 of Fig. 1, as it appears under load in service; and Fig. 5 is a section on line 5—5 of Fig. 4.

Referring to the drawing there is shown a tire casing having a body portion 11 and a tread portion 12. The tread comprises a center rib 13, shoulder ribs 14 and 15, and intermediate ribs 16, 17, 18, 19, 20 and 21 there being circumferential grooves 7 between adjacent ribs. A series of serrations 8 and 9 are formed in the outer side faces of the shoulder ribs 14 and 15 respectively and extend for a short distance down the sidewall of the tire in which position they assist in preventing side skidding and generally improve the traction quality of the tire. Both lateral faces of all said ribs are serrated or notched their full radial height. The height, width and spacing of the ribs are such that in contact with the ground under load in service the ribs distort until lateral faces of adjacent ribs contact and laterally brace each other at circumferentially spaced recurring portions of the ribs, said contact points being predetermined by the relative design of the serrations. In similar manner, as will be seen by reference to Fig. 4, the lateral faces of the ribs do not contact at the portions between said successive or recurring contact positions. It will also be seen that the teeth 23 of serrations of ribs 16, 17, 20 and 21 have a pitch double the pitch of the confronting serrations 24 on adjacent ribs 13, 14, 15, 18 and 19. Also that the teeth and notches of the serrations are so arranged longitudinally of the ribs that the teeth of the double pitch serrations laterally oppose every other notch of notches 26 between teeth 24. The angle of the sides of teeth 23 and the sides of notches 26 are substantially the same relative to the median plane of the tire. When the ribs of the tire are distorted under load in service they flatten and spread laterally bringing teeth 23 into their opposed notches 26 with the points of teeth 23 contacting the bottoms of notches 26, and with the sides of notches 26 contacting the sides of the teeth. While said teeth completely fill said notches which they enter, as will be seen by again referring to Fig. 4, the altitude of teeth 23 is approximately twice the altitude of teeth 24; thus it will be seen that when adjacent ribs of the tread come laterally into abutted relation, rhombus shaped recesses 6 will remain unclosed to the full height of said abutting ribs. Referring now to Fig. 5 it will be seen that under load the ribs of the tire come into circumferentially spaced contact at the road surface, which contacts extend a distance radially inwardly toward the bottom of the grooves 7. However, none of the groovese entirely close at their bottoms, but instead, at the loaded area of the tread there are always small openings 27 providing an escape for air and water which may become trapped in openings 6.

The apices or points of serrations 23 and the bottoms of notches 26 are normally spaced apart transversely of the tire a relatively short distance, as for example, in the case of a 7.00" passenger tire, embodying the present invention, such separation may be .062" at the road contact surface of the tire when not under load. On the same 7.00" tire the normal width of an opening 6 transversely of the tread would be, for example, .363". For further example, the rib in said 7.00" tire corresponding to rib 13 may measure at a right angle to the median plane of the tire .471", while ribs corresponding to 20 or 21 may similarly have a width transversely of the tire of .455". The shoulder ribs may have a similar width of .676". All the ribs may be .500" in height or the height of the different ribs may vary.

As will best be understood by reference to Figs. 3 and 4, the openings 6 occur in lines that are oblique with relation to the median plane of the tire. This feature is desirable in that it presents a broken tread surface to the road at all times.

In service under load the ribs distort only slightly before the teeth 23 contact the bottoms of laterally opposed notches 26 whereby all the ribs in contact with the ground are in lateral engagement at short intermittent intervals along each rib. The contact of teeth 23 against the bottom of their laterally opposed notches forms the recesses 6 under the loaded area of the tread. As indicated above air trapped in openings 6 between the pavement and the sides of the openings escapes to the atmosphere along the bottom of the grooves through the unclosed portion 27 thereby preventing a partial vacuum forming in said opening. This feature prevents the objectionable noise of a vacuum-cup design tread. It also avoids the expenditure of force to break the edges of a vacuum cup loose from the pavement as would be necessary if the openings 6 were converted into vacuum cups.

If the tread embodying the present invention is run in a rain or upon a wet pavement water will enter and escape from the openings 6 in the same manner as just explained in reference to air. This escape of water permits the edges of openings 6 to pierce the film of water on the pavement and to contact the pavement whereby the anti skid and traction qualities of the tread are substantially improved.

The slight lateral movement of the ribs required to bring the ribs of the tread into lateral abutment is not enough to cause objectionable lack of lateral stability of the tread over prior art treads of equally narrow, high ribs. This is because the ribs of applicant's design zig zag longitudinally about the tread. The zig zag extends the ribs in short lengths obliquely across the tire whichs adds stability to the ribs against side sway and against falling over sidewise under load.

Since applicant's tread is stable and the ribs remain upstanding with but little distortion under load the tread is an improvement in respect to tread life over narrow ribbed treads of the prior art.

By referring to Fig. 2 of the drawing it will be seen that the ribs in transverse section are tapered from their base to their flat tops or crests. Thus it will be seen that openings 6 have radially inwardly tapering sides. When pebbles are lodged in openings 6 and the openings leave contact with the ground they quickly open to their molded size, the spacing between the ribs reforming and the tapered sides of the openings 6 ejecting the pebbles from said openings. The narrow grooves between the apices of teeth 23 and opposed notches 26 are too narrow to catch pebbles, and the like, large enough to seriously damage the tread.

The invention has been illustrated in reference to a nine rib tread tire, but the invention is not to be limited to such a tire as any number of ribs found satisfactory may be used. Other changes and modifications will occur to those familiar with the art; therefore, the invention is to be limited only by the scope of the prior art and the appended claims.

What is claimed is:

1. A tire tread construction comprising a plurality of circumferentially extending continuous ribs defining intervening grooves of varying width, said ribs being normally laterally spaced throughout their lengths, the height and width of said ribs relative to the width of said grooves being such that under normal load in service said ribs distort and abut adjacent ribs, the lateral faces of said ribs being uniformly and continuously serrated throughout their length, the pitch of the serrations on one side of any one of said grooves being twice the pitch of the serrations on the other side of the same groove.

2. A tire tread comprising a plurality of functionally continuous circumferentially extending ribs separated by grooves and forming a tread pattern, the lateral dimensions of said ribs being such that the ribs form contact with adjacent ribs when under load and in contact with the supporting surface, the lateral faces of said ribs being uniformly and continuously serrated, alternate ribs in said pattern having twice as many said serrations as ribs intervening said alternate ribs, the points of the teeth of the successive serrations of the ribs between said alternate ribs being aligned with confronting notches between the serrations of the said alternate ribs whereby under load said teeth points engage the bottom of every other one of said notches of the ribs intervening said alternate ribs, the altitude of said engaging teeth being greater than the depth of the confronting notches.

3. A tire tread construction formed with a plurality of endless circumferential ribs defining intervening grooves, the height and width of said ribs relative to the width of said grooves and the configuration of the lateral faces of said ribs being such that under normal load in service said ribs distort until their radial outer portions make lateral abutment at longitudinal intervals, the lateral faces of said ribs being uniformly and continuously serrated throughout their length, the pitch of the serrations on one side of a said groove being large and twice the pitch of small serrations on the other side of said groove, the teeth of the confronting serrations meshing under load with consecutive large pitch teeth entering alternate notches between the small pitch teeth, the altitude of the triangles forming the teeth of the large serrations relative to the depth of the notches in which they enter being such that when the tread is under load the apices of the teeth of said large serrations abut against the bottom of the notches they enter leaving the portions of said grooves between the said abutting portions unclosed forming recesses with their radially outward open ends exposed to the road surface when said tread is under load in service.

4. A tire construction comprising a tread portion formed with a plurality of endless circumferential ribs defining intervening circumferential grooves, the lateral faces of said ribs being continuously serrated throughout, the teeth and notches of the serration of confronting sides of said ribs having a ratio of two to one in number and being in meshed relation, the altitudes of the triangles forming the teeth relative to the depth of the notches and the width of said grooves being such that when the tread is under load the apices of the tread teeth having the larger ratio of pitch abut against the bottom of confronting notches leaving the portions of said grooves between the said abutting portions unclosed forming recesses with open ends exposed to the road surface.

5. A tire construction comprising a tread portion formed with a plurality of circumferential ribs defining intervening circumferential grooves, the lateral faces of said ribs being continuously serrated throughout, the teeth and notches of the serration of confronting sides of said ribs having a ratio of two to one in number and being in meshed relation, the altitudes of the triangles forming the teeth relative to the depth of the notches and the width of said grooves being such that when the tread is under load the apices of the tread teeth having the larger ratio of pitch abut against the bottom of confronting notches leaving the portions of said grooves between the said abutting portions unclosed forming recesses with open ends exposed to the road surface.

ALBERT HARGRAVES.

REFERENCES CITED

The following references are of record in the file of this patent:

UNITED STATES PATENTS

| Number | Name | Date |
| --- | --- | --- |
| D. 87,949 | Morin | Oct. 11, 1932 |
| 2,068,050 | Bishop | Jan. 19, 1937 |
| 2,236,903 | Hale | Apr. 1, 1941 |